US010050552B2

(12) United States Patent
Li et al.

(10) Patent No.: US 10,050,552 B2
(45) Date of Patent: Aug. 14, 2018

(54) HIGH-FREQUENCY ISOLATION ALTERNATING/DIRECT CURRENT CONVERSION CIRCUIT AND CONTROL METHOD THEREOF

(71) Applicant: SHENZHEN BOYN ELECTRIC CO., LTD., Shenzhen, Guangdong (CN)

(72) Inventors: Lunquan Li, Guangdong (CN); Jiajian Liu, Guangdong (CN); Sha Yan, Guangdong (CN)

(73) Assignee: SHENZHEN BOYN ELECTRIC CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/690,299

(22) Filed: Aug. 30, 2017

(65) Prior Publication Data
US 2017/0366099 A1    Dec. 21, 2017

Related U.S. Application Data

(63) Continuation of application No. PCT/CN2016/075813, filed on Mar. 7, 2016.

(30) Foreign Application Priority Data

Mar. 18, 2015  (CN) .......................... 2015 1 0119493

(51) Int. Cl.
*H02M 7/162* (2006.01)
*H02M 3/335* (2006.01)
*H02M 7/219* (2006.01)

(52) U.S. Cl.
CPC ..... *H02M 7/1623* (2013.01); *H02M 3/33592* (2013.01); *H02M 2007/2195* (2013.01)

(58) Field of Classification Search
CPC .... H02M 7/217; H02M 7/1623; H02M 7/219; H02M 7/797; H02M 2007/2195
See application file for complete search history.

(56) References Cited

U.S. PATENT DOCUMENTS 9,318,967 B2 *  4/2016  Xiong ............... H02M 3/33546
9,614,453 B2 *  4/2017  Dai ....................... H02M 3/337
(Continued)

FOREIGN PATENT DOCUMENTS

CN          1985423 A     6/2007
CN        102437628 A     5/2012
(Continued)

OTHER PUBLICATIONS

Bradley Reese et al., "High Voltage, High Power Density Bi-Directional Multi-Level Converters Utilizing Silicon and Silicon Carbide(SiC)Switches", Applied Power Electronics Conference and Exposition, 2008. APEC 2008. Twenty-Third Annual IEEE, NJ, USA, Feb. 24, 2008, pp. 252-258, XP031253256.
(Continued)

*Primary Examiner* — Yusef A Ahmed
(74) *Attorney, Agent, or Firm* — Winston Hsu (57) ABSTRACT

A high-frequency isolation alternating/direct current conversion circuit and a control method thereof are disclosed. The conversion circuit includes an alternating current source, a direct current source, a resonant capacitor, a high-voltage energy-storage filter, a high-frequency inverter bridge, a drive circuit, a resonant inductor, a high-frequency isolation transformer, a direct current side synchronous switch, a control circuit, and the like. The conversion circuit is made to be switched between two working modes, a rectification mode and an inversion mode by using a preset direct current source reference voltage as a reference, according to an external voltage reference, and by using different turn-on working modes of the high-frequency inverter bridge.

9 Claims, 3 Drawing Sheets

(56) References Cited

U.S. PATENT DOCUMENTS

| | | | | |
|---|---|---|---|---|
| 2003/0185026 | A1* | 10/2003 | Matsuda | H02M 3/285 363/71 |
| 2004/0233685 | A1* | 11/2004 | Matsuo | H02M 3/285 363/65 |
| 2007/0086224 | A1 | 4/2007 | Phadke | |
| 2008/0298093 | A1 | 12/2008 | Jin | |
| 2010/0128498 | A1* | 5/2010 | Nymand | H02M 3/335 363/17 |
| 2011/0128758 | A1* | 6/2011 | Ueno | H02M 3/335 363/17 |
| 2011/0149606 | A1* | 6/2011 | Ho | B60L 11/1811 363/17 |
| 2012/0262953 | A1* | 10/2012 | Jungreis | H02M 3/285 363/17 |
| 2012/0313430 | A1* | 12/2012 | Wu | H02M 3/3376 307/9.1 |
| 2013/0242617 | A1* | 9/2013 | Zhang | H02M 3/33569 363/17 |
| 2013/0250623 | A1* | 9/2013 | Xu | H02M 3/285 363/17 |
| 2014/0104891 | A1* | 4/2014 | Kim | H02M 3/33569 363/20 |
| 2014/0177293 | A1* | 6/2014 | Eckhardt | H02M 1/12 363/37 |
| 2014/0307481 | A1* | 10/2014 | Wang | H02M 3/285 363/17 |
| 2014/0340940 | A1* | 11/2014 | Ouyang | H01F 30/06 363/17 |
| 2015/0103561 | A1* | 4/2015 | Dai | H02M 3/3353 363/17 |
| 2015/0103564 | A1* | 4/2015 | Duan | H02M 3/285 363/21.02 |
| 2015/0229225 | A1* | 8/2015 | Jang | H02M 3/285 363/17 |
| 2015/0333635 | A1* | 11/2015 | Yan | H02M 3/3376 363/17 |
| 2016/0181871 | A1* | 6/2016 | Krumme | A61B 6/03 307/104 |
| 2016/0248333 | A1* | 8/2016 | Nakazawa | B60L 1/00 |
| 2016/0303987 | A1* | 10/2016 | Kawamura | B60L 11/1812 |
| 2016/0336873 | A1* | 11/2016 | Ayai | H02M 3/33576 |
| 2017/0005565 | A1* | 1/2017 | Bai | H02M 3/33507 |
| 2017/0179836 | A1* | 6/2017 | Kondo | H02M 3/33546 |
| 2017/0207712 | A1* | 7/2017 | Chiang | H02M 1/12 |

FOREIGN PATENT DOCUMENTS

| | | |
|---|---|---|
| CN | 102570560 A | 7/2012 |
| CN | 104201908 A | 12/2014 |
| CN | 104753369 A | 7/2015 |
| CN | 204465374 U | 7/2015 |
| JP | 200137226 A | 2/2001 |
| JP | 200178449 A | 3/2001 |
| JP | 200533956 A | 2/2005 |
| JP | 2014241674 A | 12/2014 |

OTHER PUBLICATIONS

Xiaodong Li et al., "Analysis and Design of High-Frequency Isolated Dual-Bridge Series Resonant DC/DC Converter", Apr. 2010, pp. 850-862, vol. 25, No. 4, IEEE Transactions on Power Electronics, USA, XP011296460.

Biao Zhao et al., "Overview of Dual-Active-Bridge Isolated Bidirectional DC-DC Converter for High-Frequency-Link Power-Conversion System", Aug. 2014, pp. 4091-4106, vol. 29, No. 8, IEEE Transactions on Power Electronics, USA, XP011544126.

Nadia Mei Lin Tan et al., "Design and Performance of a Bidirectional Isolated DC-DC Converter for a Battery Energy Storage System", Mar. 2012, pp. 1237-1248, vol. 27, No. 3, IEEE Transactions on Power Electronics, USA, XP011406675.

Texas Instruments, "Using the UCC28950EVM-442 User's Guide 600-W, Phase-Shifted, Full-Bridge Converter", May 31, 2010, XP055460878.

Weiyi Feng et al., "A Universal Adaptive Driving Scheme for Synchronous Rectification in LLC Resonant Converters", Aug. 2012, pp. 3775-3781, vol. 27, No. 8, IEEE Transactions on Power Electronics, USA, XP011441715.

* cited by examiner

HIGH-FREQUENCY ISOLATION ALTERNATING/DIRECT CURRENT CONVERSION CIRCUIT AND CONTROL METHOD THEREOF

CROSS REFERENCE TO RELATED APPLICATIONS

This application is a continuation application of PCT/CN2016/075813, filed on Mar. 7, 2016. The contents of PCT/CN2016/075813 are all hereby incorporated by reference.

BACKGROUND

Field of the Invention

The present application relates to a switch mode power supply, and in particular, an efficient high-frequency isolation alternating/direct current conversion circuit and a control method thereof.

Related Arts

In an application scenario requiring alternating/direct current bidirectional conversion (that is, charging and discharging), for example, in steps of aging formation and detection of an energy storage inverter, an off-grid inverter, and a battery plant, mainly a low-frequency isolation scheme is used. A main reason is that a high-frequency isolation bidirectional conversion technology is relatively complex, and a high-frequency switch loss caused by high-frequency conversion lowers efficiency; the loss outweighs the gain. A low-frequency transformer isolation technology is relatively mature and stable, but has very significant disadvantages compared with the high-frequency isolation technology: in a low-frequency isolation method, a transformer has a large volume and is heavy; therefore, it is difficult to promote the transformer in many application scenarios, and using of the transformer is limited. Therefore, two compromised solutions are provided: one solution is using a method for separating a charge circuit and a discharge circuit, to implement high frequency of isolation of the transformer; the volume is reduced to some degree, and efficiency may be relatively high, but the relative volume is still relatively large; the other solution is using a circuit having a bidirectional conversion function, which sacrifices particular efficiency and implements high frequency of isolation; in this way, the volume may be reduced to a great degree, and compared with a unidirectional conversion technology, power density and efficiency are improved in some degree, but efficiency is still sacrificed in some degree.

Therefore, it is necessary to design a new circuit capable of implementing high power density, high efficiency, and electric isolation by using a proper conversion circuit and an appropriate control method and capable of satisfying conversion of relatively wide voltage ranges of different battery types.

SUMMARY

The present application provides a high-frequency isolation alternating/direct current conversion circuit capable of switching between a rectification mode and an inversion mode and working and a control method thereof, to resolve a technical problem that an existing alternating/direct current bidirectional conversion circuit is complexly designed, can hardly implement high-frequency isolation, and has low working efficiency.

An embodiment of the present application provides a high-frequency isolation alternating/direct current conversion circuit, including: a single-phase alternating current source, a direct current source, a first capacitor, a second capacitor, a high-voltage energy-storage filter, a high-frequency full-bridge inverter circuit, a first high-frequency half-bridge inverter circuit, a second high-frequency half-bridge inverter circuit, a drive circuit, a first inductor to a third inductor, a first high-frequency isolation transformer a second inductor, a second high-frequency isolation transformer, a first direct current side synchronous switch, a second direct current side synchronous switch, and a control circuit connected to the drive circuit, where the first capacitor is connected in parallel to the single-phase alternating current source, the second capacitor is connected in parallel to the direct current source, and the high-frequency full-bridge inverter circuit, the first high-frequency half-bridge inverter circuit and the second high-frequency half-bridge inverter circuit are each composed of a switch tube; in the high-frequency full-bridge inverter circuit, a first alternating current end and a second alternating current end are respectively connected to a second end of the first inductor and a second end of the first capacitor, a first direct current end and a second direct current end are respectively connected to a positive pole and a negative pole of the high-voltage energy-storage filter, and a first end of the first inductor is connected to a first end of the first capacitor; in the first high-frequency half-bridge inverter circuit, a first direct current end and a second direct current end are respectively connected to the positive pole and the negative pole of the high-voltage energy-storage filter, a first alternating current end is connected to one end of the first high-frequency isolation transformer at a single-phase alternating current source side by means of the second inductor, and a second alternating current end is connected to the other end of the first high-frequency isolation transformer at the single-phase alternating current source side; in the second high-frequency half-bridge inverter circuit, a first direct current end and a second direct current end are respectively connected to the positive pole and the negative pole of the high-voltage energy-storage filter, a first alternating current end is connected to one end of the second high-frequency isolation transformer at a single-phase alternating current source side by means of the third inductor, and a second alternating current end is connected to the other end of the second high-frequency isolation transformer at the single-phase alternating current source side; the first direct current side synchronous switch includes a first switch tube and a second switch tube, drains of the first switch tube and the second switch tube are respectively connected to a first end and a third end of the first high-frequency isolation transformer at the direct current source side, and sources of the first switch tube and the second switch tube are both connected to a negative pole of the direct current source; the second direct current side synchronous switch includes a third switch tube and a fourth switch tube, drains of the third switch tube and the fourth switch tube are respectively connected to a first end and a third end of the second high-frequency isolation transformer at the direct current source side, and sources of the third switch tube and the fourth switch tube are both connected to the negative pole of the direct current source; and second ends of the first high-frequency isolation transformer and the second high-frequency isolation transformer at the direct current source side are both connected to a positive pole of the direct current source.

Another embodiment of the present application provides a control method for the high-frequency isolation alternating/direct current conversion circuit, used for controlling the conversion circuit to switch between a rectification mode and an inversion mode for operating, where the control method includes: when the conversion circuit operates in the rectification mode, controlling the high-frequency full-bridge inverter circuit to operate in a PFC rectification state and performing voltage boosting; controlling the first high-frequency half-bridge inverter circuit and the second high-frequency half-bridge inverter circuit to operate in an inversion state; under the condition of an absorption current of the direct current source is greater than or equal to 0.1 time of a rated current, driving, by using a PWM signal, the first switch tube to the fourth switch tube to be turned on, where turn-on timing sequences of the first switch tube and the second switch tube offset by using the center of a turn-on timing sequence of the first high-frequency half-bridge inverter circuit as a basis, and turn-on timing sequences of the third switch tube and the fourth switch tube offset by using the center of a turn-on timing sequence of the second high-frequency half-bridge inverter circuit as a basis; and adjusting a turn-on duty cycle according to a switching frequency to obtain high efficiency; and when the conversion circuit operates in the inversion mode, according to a voltage of the direct current source, controlling the first high-frequency half-bridge inverter circuit to be turned on/turned off by using the center of a turn-on timing sequence of the first direct current side synchronous switch as a basis and the second high-frequency half-bridge inverter circuit to be turned on/turned off by using the center of a turn-on timing sequence of the second direct current side synchronous switch as a basis, and performing offset and adjusting the turn-on duty cycle according to the voltage of the direct current source to obtain high efficiency.

Another embodiment of the present application further provides a high-frequency isolation alternating/direct current conversion circuit, including: a single-phase alternating current source, a direct current source, a first capacitor, a second capacitor, a third capacitor, a high-voltage energy-storage filter, a first high-frequency full-bridge inverter circuit, a second high-frequency full-bridge inverter circuit, a third high-frequency full-bridge inverter circuit, a drive circuit, a first inductor, a second inductor, a high-frequency isolation transformer, and a control circuit connected to the drive circuit, where the first capacitor is connected in parallel to the single-phase alternating current source, the second capacitor is connected in parallel to the direct current source, and the first high-frequency full-bridge inverter circuit, the second high-frequency full-bridge inverter circuit and the third high-frequency full-bridge inverter circuit are each composed of a switch tube; in the first high-frequency full-bridge inverter circuit, a first alternating current end and a second alternating current end are respectively connected to a second end of the first inductor and a second end of the first capacitor, a first direct current end and a second direct current end are respectively connected to a positive pole and a negative pole of the high-voltage energy-storage filter, and a first end of the first inductor is connected to a first end of the first capacitor; in the second high-frequency full-bridge inverter circuit, a first alternating current end is connected to a first end of the high-frequency isolation transformer at a single-phase alternating current source side by means of the second inductor, a second alternating current end is connected to a second end of the high-frequency isolation transformer at the single-phase alternating current source side by means of the third capacitor, and a first direct current end and a second direct current end are respectively connected to the positive pole and the negative pole of the high-voltage energy-storage filter; and in the third high-frequency full-bridge inverter circuit, a first direct current end and a second direct current end are respectively connected to a positive pole and a negative pole of the direct current source, and a first alternating current end and a second alternating current end are respectively connected to a first end and a second end of the high-frequency isolation transformer at the direct current source side.

Another embodiment of the present application further provides a high-frequency isolation alternating/direct current conversion circuit, including: a three-phase alternating current source, a direct current source, a high-voltage energy-storage filter, a first high-frequency full-bridge inverter circuit, a second high-frequency full-bridge inverter circuit, a third high-frequency full-bridge inverter circuit, a drive circuit, a resonant inductor, a resonant capacitor, a direct current side filter capacitor, a high-frequency isolation transformer, and a control circuit connected to the drive circuit, where the three-phase alternating current source is coupled to an alternating current end of the first high-frequency full-bridge inverter circuit, a first direct current end and a second direct current end of the first high-frequency full-bridge inverter circuit are respectively connected to a positive pole and a negative pole of the high-voltage energy-storage filter, and an LC filter is connected between the three-phase alternating current source and the alternating current end of the first high-frequency full-bridge inverter circuit; in the second high-frequency full-bridge inverter circuit, a first alternating current end is connected to a first end of the high-frequency isolation transformer at a three-phase alternating current source side by means of the resonant inductor, a second alternating current end is connected to a second end of the high-frequency isolation transformer at the three-phase alternating current source side by means of the resonant capacitor, and a first direct current end and a second direct current end are respectively connected to the positive pole and the negative pole of the high-voltage energy-storage filter; and in the third high-frequency full-bridge inverter circuit, a first direct current end and a second direct current end are respectively connected to a positive pole and a negative pole of the direct current source, and a first alternating current end and a second alternating current end are respectively connected to a first end and a second end of the high-frequency isolation transformer at the direct current source side.

In the foregoing high-frequency isolation alternating/direct current conversion circuit and the control method thereof provided in the present application, the conversion circuit automatically switches and works between a rectification mode and an inversion mode by using a specified direct current source reference voltage as a reference and according to a real-time voltage for the direct current source, frequencies and duty cycles of a high-frequency inverter bridge at a direct current side (including the first high-frequency half-bridge inverter circuit and the second high-frequency half-bridge inverter circuit) and a synchronous switch at a direct current side (including the first direct current side synchronous switch and the second direct current side synchronous switch) are changed according to the real-time voltage of the direct current source and a release or an absorption (the inversion mode: release; the rectification mode: absorption) current in a working process, and soft switching is implemented by using a resonant state of topology of the high-frequency inverter bridge, thereby lowering turn-on and turn-off stress of switch tubes in a bridge inverter circuit, reducing switch loss, and helping improve a working frequency of the inverter circuit or improve efficiency so as to improve power density and reduce the volume. In this way, high power density, high efficiency, and high-frequency electric isolation are implemented. In addition, reverse conversion of a direct current voltage of a wide range is implemented by using control over a turn-on timing sequence of the high-frequency inverter bridge, so that the topology obtains high efficiency in a similar application of a relatively wide voltage change range such as a storage battery, and efficiency thereof is greatly improved compared with a conventional converter.

DESCRIPTION FOR REFERENCE NUMERALS

V1: single-phase alternating current source
V2: direct current source
C1 to C6: capacitor
C: high-voltage energy-storage filter
L1 to L3: inductor
Q1 to Q14: switch tube
$T_{RA}$: first high-frequency isolation transformer
$T_{RB}$: second high-frequency isolation transformer
$T_R$: high-frequency isolation transformer
A1 to A5: five ends of the first high-frequency isolation transformer $T_{RA}$
B1 to B5: five ends of the second high-frequency isolation transformer $T_{RB}$
1, 2, 4, 5: four ends of the high-frequency isolation transformer $T_R$
V1a, V1b, V1c: three-phase alternating current source
L1a, L1b, L1c: inductor
C1a, C1b, C1c: capacitor

DETAILED DESCRIPTION

The present application is further described below with reference to the accompanying drawings and specific implementations.

Embodiment 1

Figure 1:
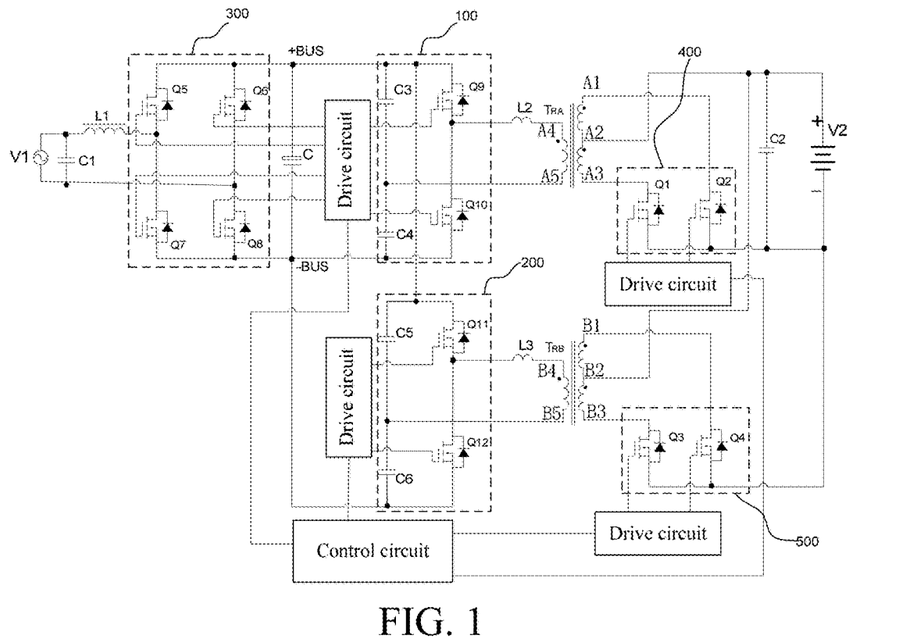
FIG. 1 is a schematic diagram of a high-frequency isolation alternating/direct current conversion circuit according to Embodiment 1 of the present application.

This embodiment provides a high-frequency isolation alternating/direct current conversion circuit shown in FIG. 1, including: a single-phase alternating current source V1, a direct current source V2, a first capacitor C1, a second capacitor C2, a high-voltage energy-storage filter C, a high-frequency full-bridge inverter circuit 300, a first high-frequency half-bridge inverter circuit 100, a second high-frequency half-bridge inverter circuit 200, a drive circuit, a first inductor L1, a second inductor L2, a third inductor L3, a first high-frequency isolation transformer $T_{RA}$, a second high-frequency isolation transformer $T_{RB}$, a first direct current side synchronous switch 400, a second direct current side synchronous switch 500, and a control circuit connected to the drive circuit. The first capacitor C1 is connected in parallel to the single-phase alternating current source V1, the second capacitor C2 is connected to in parallel to the direct current source V2, and the high-frequency full-bridge inverter circuit 300, the first high-frequency half-bridge inverter circuit 100 to the second high-frequency half-bridge inverter circuit 100 are each composed of a switch tube.

As shown in FIG. 1, the high-frequency full-bridge inverter circuit 300 includes four input/output ends, that is, two alternating current ends (for inputting or outputting an alternating current signal) and two direct current ends (for inputting or outputting a direct current signal) respectively. One alternating current end is connected to a second end of the first inductor L1, the other alternating current end is connected to a second end of the first capacitor C1, and a first end of the first inductor L1 is connected to a first end of the first capacitor C1. Two direct current ends are respectively connected to a positive pole +BUS and a negative pole −BUS of the high-voltage energy-storage filter C. In a specific example, the high-frequency full-bridge inverter circuit 300 includes four switch tubes Q5 to Q8. A source of the switch tube Q5 and a drain of the switch tube Q7 are connected and led out to form an alternating current end to connect to a second end of the first inductor L1. A source of the switch tube Q6 and a drain of the switch tube Q8 are connected and led out to form the other alternating current end to connect to the second end of the first capacitor C1. Drains of the switch tubes Q5 and Q6 are connected and led out to form a direct current end to connect to the positive pole +BUS of the high-voltage energy-storage filter C. Sources of the switch tubes Q7 and Q8 are connected and led out to form the other direct current end to connect to the negative pole −BUS of the high-voltage energy-storage filter C. When the conversion circuit operates in a rectification mode, the high-frequency full-bridge inverter circuit 300 operates in a power factor correction (PFC) rectification mode and is used as a boost switch, the two alternating current ends are signal input ends, the two direct current ends are signal output ends, and an alternating current signal passing through an LC filter (including a first capacitor C1 and a first inductor L1) is converted into a direct current signal. When the conversion circuit operates in an inversion mode, the high-frequency full-bridge inverter circuit 300 is used as a high-frequency inversion switch, the two direct current ends are signal input ends, the two alternating current ends are signal output ends, and a direct current signal from output ends of the first high-frequency half-bridge inverter circuit and the second high-frequency half-bridge inverter circuit is converted into an alternating current signal. It should be noted that the working frequency of the high-frequency full-bridge inverter circuit 300 is above 30 KHz.

As shown in FIG. 1, the first high-frequency half-bridge inverter circuit 100 includes four input/output ends, that is, two alternating current ends (for inputting or outputting an alternating current signal) and two direct current ends (for inputting or outputting a direct current signal) respectively. The two direct current ends are respectively connected to the positive pole +BUS and the negative pole −BUS of the high-voltage energy-storage filter C. One alternating current end is connected to an end A4 of the first high-frequency isolation transformer $T_{RA}$ at a single-phase alternating current source side (the single-phase alternating current source side herein refers to a side that outputs a signal to an alternating current side or couples a signal from an alternating current side) by means of the second inductor L2, and the other alternating current end is connected to another end A5 of the first high-frequency isolation transformer $T_{RA}$ at the single-phase alternating current source side. Specifically, the first high-frequency half-bridge inverter circuit 100 includes two switch tubes Q9 and Q10 and two capacitors C3 and C4. A first end of the capacitor C3 and a drain of the switch tube Q9 are connected and led out to form one direct current end (the direct current end is connected to the positive pole +BUS of the high-voltage energy-storage filter C). A second end of the capacitor C3 is connected to a first end of the capacitor C4. A second end of the capacitor C4 and a source of the switch tube Q10 are connected and led out to form the other direct current end (the direct current end is connected to the negative pole −BUS of the high-voltage energy-storage filter C). A source of the switch tube Q9 and a drain of the switch tube Q10 are connected and led out to form one alternating current end (the alternating current end is connected to the first end A4 of the first high-frequency isolation transformer $T_{RA}$ at the single-phase alternating current source side by connecting in series to the second inductor L2). The second end of the capacitor C3 (equivalent to the first end of the capacitor C4) is led out to form the other alternating current end to connect to the second end A5 of the first high-frequency isolation transformer $T_{RA}$ at the single-phase alternating current source side.

As shown in FIG. 1, connections and working principles of the second high-frequency half-bridge inverter circuit 200 are the same as those of the first high-frequency half-bridge inverter circuit 100. The second high-frequency half-bridge inverter circuit 200 includes two switch tubes Q11 and Q12 and two capacitors C5 and C6. Two direct current ends are respectively connected to the positive pole +BUS and the negative pole −BUS of the high-voltage energy-storage filter C. One alternating current end is connected to one end B4 of the second high-frequency isolation transformer $T_{RB}$ at a single-phase alternating current source side by means of the third inductor L3. The other alternating current end is connected to the other end B5 of the second high-frequency isolation transformer $T_{RB}$ at the single-phase alternating current source side. A first end of the capacitor C5 and a drain of the switch tube Q11 are connected and led out to form one direct current end. A second end of the capacitor C5 is connected to a first end of the capacitor C6. A second end of the capacitor C6 and a source of the switch tube Q12 are connected and led out to form the other direct current end. A source of the switch tube Q11 and a drain of the switch tube Q12 are connected and led out to form one alternating current end. The second end of the capacitor C5 is led out to form the other alternating current end to connect to the second end B5 of the second high-frequency isolation transformer $T_{RB}$ at the alternating current source side.

As shown in FIG. 1, the first direct current side synchronous switch 400 includes two switch tubes Q1 and Q2. Drains of the switch tubes Q1 and Q2 are respectively connected to a first end A1 and a third end A3 of the first high-frequency isolation transformer $T_{RA}$ at a direct current source side. Sources of the switch tubes Q1 and Q2 are both connected to a negative pole of the direct current source V2. Connections and working principles of the second direct current side synchronous switch 500 are the same as those of the first direct current side synchronous switch 400: drains of the switch tubes Q3 and Q4 are respectively connected to a first end B1 and a third end B3 of the second high-frequency isolation transformer $T_{RB}$ at the direct current source side, and sources of the switch tubes Q3 and Q4 are both connected to the negative pole of the direct current source V2. In addition, second ends A2 and B2 of the first high-frequency isolation transformer $T_{RA}$ and the second high-frequency isolation transformer $T_{RB}$ at the direct current source side are both connected to a positive pole of the direct current source V2.

It should be noted that working frequencies of the first high-frequency half-bridge inverter circuit and the second high-frequency half-bridge inverter circuit and the first direct current side synchronous switch and the second direct current side synchronous switch are above 100 KHz.

Preferably, four capacitors C3 to C6 of the first high-frequency half-bridge inverter circuit and the second high-frequency half-bridge inverter circuit are high-frequency non-polar capacitors.

Preferably, the high-voltage energy-storage filter C is an electrolytic capacitor. The number of turns of coils of the first high-frequency isolation transformer $T_{RA}$ and the second high-frequency isolation transformer $T_{RB}$ at the direct current source side is less than 4, and the first high-frequency isolation transformer $T_{RA}$ and the second high-frequency isolation transformer $T_{RB}$ at the direct current source side have normal leakage inductance. A free-wheeling filter inductor does not need to be added to a direct current side synchronous switch. An optimal application of the conversion circuit is a case in which the amplitude of the direct current source V2 is higher than 8 V and lower than 45 V, and the output power is between 200 W and 2 KW.

This embodiment further provides a control method for the foregoing conversion circuit, used for switching a working mode (a rectification mode or an inversion mode) of a circuit according to a real-time voltage value of the direct current source V2. The control method includes: when the conversion circuit operates in the rectification mode, controlling the high-frequency full-bridge inverter circuit to operate in a PFC rectification state and performing voltage boosting; controlling the first high-frequency half-bridge inverter circuit and the second high-frequency half-bridge inverter circuit to operate in an inversion state; under the condition of an absorption current of the direct current source is greater than or equal to 0.1 time of a rated current, driving, by using a PWM signal, the first switch tube to the fourth switch tube to be turned on, where turn-on timing sequences of the first switch tube and the second switch tube offset by using the center of a turn-on timing sequence of the first high-frequency half-bridge inverter circuit as a basis, and turn-on timing sequences of the third switch tube and the fourth switch tube offset by using the center of a turn-on timing sequence of the second high-frequency half-bridge inverter circuit as a basis; and adjusting a turn-on duty cycle according to a switching frequency to obtain high efficiency; and when the conversion circuit operates in the inversion mode, according to a voltage of the direct current source, controlling the first high-frequency half-bridge inverter circuit to be turned on/turned off by using the center of a turn-on timing sequence of the first direct current side synchronous switch as a basis and the second high-frequency half-bridge inverter circuit to be turned on/turned off by using the center of a turn-on timing sequence of the second direct current side synchronous switch as a basis, and performing offset and adjusting the turn-on duty cycle according to the voltage of the direct current source to obtain high efficiency.

The control method is further described below by using the circuit of FIG. 1 as an example:

A controller determines whether the conversion circuit should operate in a rectification mode or an inversion mode according to a magnitude relationship between a preset voltage value and the real-time voltage value of the direct current source V2.

Figure 2:
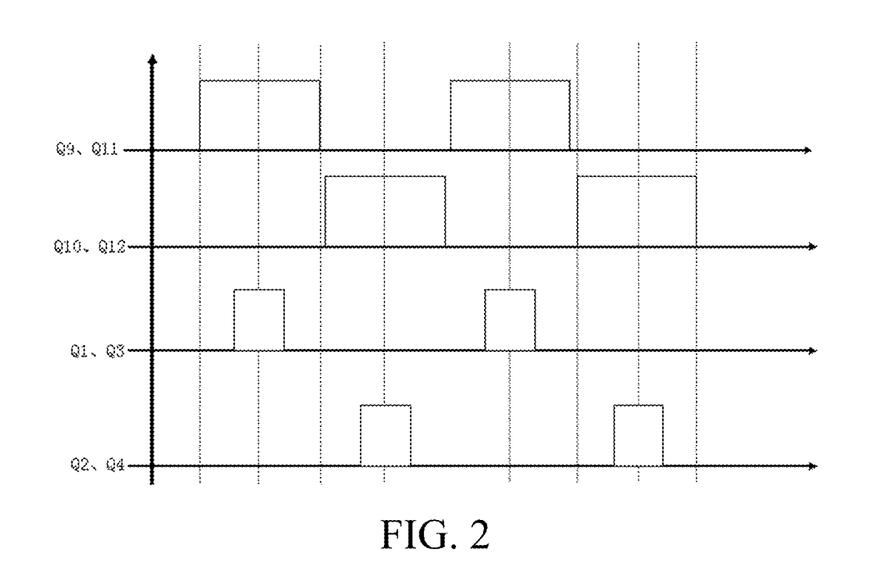
FIG. 2 is a PWM drive timing sequence diagram when the conversion circuit in FIG. 1 operates in a rectification mode.

It is assumed that the controller determines that the conversion circuit needs to operate in a rectification mode, that is, electric energy is transmitted from an alternating current source side to a direct current source side. In this case, the high-frequency full-bridge inverter circuit 300 operates in a PFC rectification state and converts an alternating current input voltage into a stable value. The first high-frequency half-bridge inverter circuit and the second high-frequency half-bridge inverter circuit operate in an inversion state. Switch tubes Q9 to Q12 are driven by using a PWM signal, and direct current voltages inputted by direct current ends thereof are inverted into high-frequency pulse voltages (alternating current signals), and the high-frequency pulse voltages are coupled by the first high-frequency isolation transformer and the second high-frequency isolation transformer and are transmitted to the first direct current side synchronous switch and the second direct current side synchronous switch. Whether the switch tubes Q1 to Q4 need to be turned on is determined according to a voltage of a direct current source and an absorption current (or referred to as a sinking current). If the absorption current of the direct current source is less than 0.1 time of a rated current, the switch tubes Q1 to Q4 are not turned on and operate in a natural rectification state of a parasitic diode. If the absorption current of the direct current source is above 0.1 time of the rated current, the switch tubes Q1 to Q4 are controlled to be turned on. In addition, refer to FIG. 2 for turn-on timing sequences. Turn-on timing sequences of the switch tubes Q1 and Q2 offset backwards by a ¼ working cycle by using the center of turn-on timing sequences of the switch tubes Q9 and Q10 as a basis. In addition, a dead time is reserved between the switch tubes Q9 and Q10 to prevent a straight-through short-circuit. Likewise, turn-on timing sequences of the switch tubes Q3 and Q4 offset backwards by ¼ by using the center of turn-on timing sequences of the switch tubes Q11 and Q12 as a basis. In addition, a dead time is reserved between the switch tubes Q11 and Q12. In a control process of the first high-frequency half-bridge inverter circuit 100 and the second high-frequency half-bridge inverter circuit 200, because of resonance effects of the capacitors C3 to C6, a resonance conversion process can be implemented. In a full-working range, a working frequency or a duty cycle is changed according to a voltage and an absorption current of a load end (the direct current source in the rectification mode is the load end). A greater absorption current indicates a greater duty cycle, a higher switching frequency, and a greater central offset, so as to ensure that soft switching of the switch tubes Q9 to Q12 can be obtained, thereby implementing high efficiency and high power density of the conversion circuit.

Figure 3:
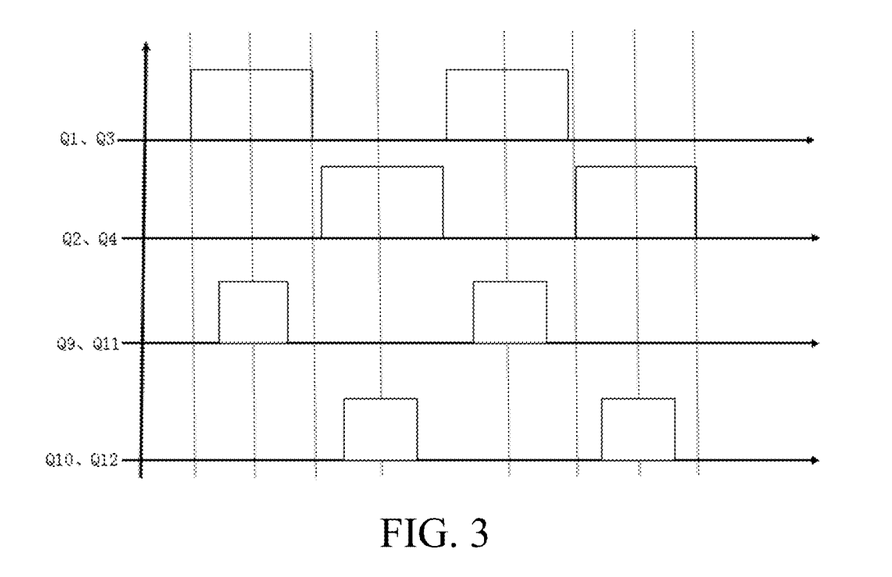
FIG. 3 is a PWM drive timing sequence diagram when the conversion circuit in FIG. 1 operates in an inversion mode.

It is assumed that the controller determines that the conversion circuit needs to operate in an inversion mode, that is, electric energy is transmitted from a direct current source side to an alternating current source side. In this case, the switch tubes Q1 to Q4 are turned on. Refer to FIG. 3 for turn-on timing sequences. Consequently, the first direct current side synchronous switch 400 and the second direct current side synchronous switch 500 operate in a high-frequency inversion state. A direct current voltage signal of the direct current source is converted into an alternating current signal, and the alternating current signal is coupled by the first high-frequency isolation transformer and the second high-frequency isolation transformer and is transmitted to the first high-frequency half-bridge inverter circuit 100 and the second high-frequency half-bridge inverter circuit 200 for rectification and voltage boosting. Refer to FIG. 3 for turn-on timing sequences of the switch tubes Q9 to Q12. A dead zone is reserved between the switch tubes Q1 and Q2 (Q3 and Q4). In addition, the turn-on timing sequences of the switch tubes Q1 and Q2 offset forwards by a ¼ working cycle by using the center of the turn-on timing sequences of the switch tubes Q9 and Q10 as a basis, and the turn-on timing sequences of the switch tubes Q3 and Q4 offset forwards by ¼ by using the center of the turn-on timing sequences of the switch tubes Q11 and Q12 as a basis. In this case, the first direct current side synchronous switch 400 and the second direct current side synchronous switch 500 are similar to conventional push-pull type structures. However, because the transformer at the direct current source side has normal leakage inductance, the direct current signal has a particular gradually rising slope after passing through the first direct current side synchronous switch and the second direct current side synchronous switch, thereby avoiding conventional push-pull.

Embodiment 2

Figure 4:
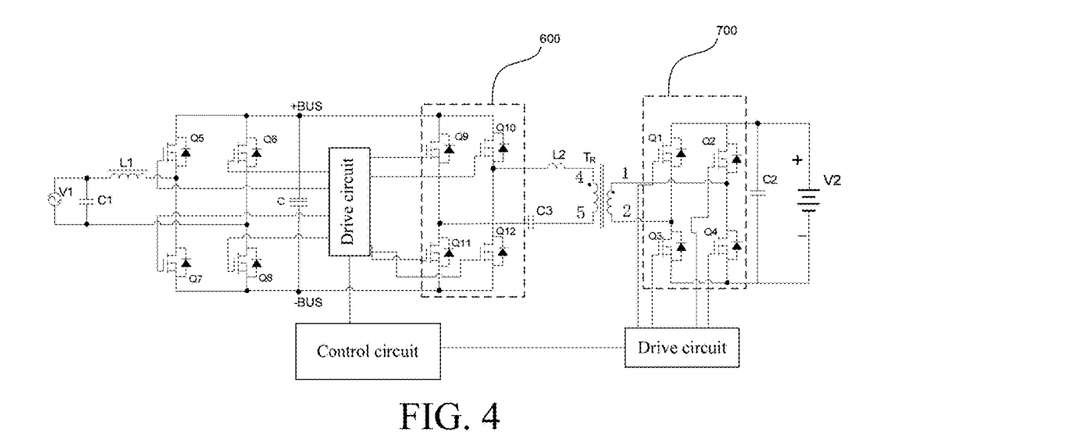
FIG. 4 is a schematic diagram of a high-frequency isolation alternating/direct current conversion circuit according to Embodiment 2 of the present application.

This embodiment provides a high-frequency isolation alternating/direct current conversion circuit similar to Embodiment 1. As shown in FIG. 4, this embodiment differs from Embodiment 1 in that: the first high-frequency half-bridge inverter circuit 100 and the second high-frequency half-bridge inverter circuit 200 in Embodiment 1 are replaced with a full-bridge inverter circuit 600, only one high-frequency isolation transformer $T_R$ is used, coils of the high-frequency isolation transformer $T_R$ at a direct current source side are reduced by one, and the first direct current side synchronous switch 400 and the second direct current side synchronous switch 500 in Embodiment 1 are replaced with a full-bridge inverter circuit 700. In this embodiment, the full-bridge inverter circuit 600 includes switch tubes Q9 to Q12. Drains of the switch tubes Q9 and Q10 are connected and led out to form a direct current end to connected to the positive pole +BUS of the high-voltage energy-storage filter C. Sources of the switch tubes Q11 and Q12 are connected and led out to form the other direct current end to connect to the negative pole −BUS of the high-voltage energy-storage filter C. Sources of the switch tubes Q9 and Q10 are respectively correspondingly connected to drains of the switch tubes Q11 and Q12 and are respectively led out to form two alternating current ends. An alternating current end led out from the source of the switch tube Q10 is connected to a first end 4 of the high-frequency isolation transformer $T_R$ at an alternating current source side by connecting an inductor L2 in series. An alternating current end led out from the source of the switch tube Q9 is connected to a first end 5 of the high-frequency isolation transformer $T_R$ at the alternating current source side by connecting a capacitor C3 in series. The high-frequency full-bridge inverter circuit 700 includes switch tubes Q1 to Q4. Drains of the switch tubes Q1 and Q2 are connected and led out to form a direct current end to connect to a positive pole of a direct current source V2. Sources of the switch tubes Q3 and Q4 are connected and led out to form the other direct current end to connect to a negative pole of the direct current source V2. Sources of the switch tubes Q1 and Q2 are respectively correspondingly connected to drains of the switch tubes Q3 and Q4, and are respectively led out to form two alternating current ends. The alternating current end led out from the source of the switch tube Q2 is connected to a first end 1 of the high-frequency isolation transformer $T_R$ at the direct current source side, and the alternating current end led out from the source of the switch tube Q1 is connected to a second end 2 of the high-frequency isolation transformer $T_R$ at the direct current source side.

The capacitor C3 in this embodiment preferably uses a high-frequency non-polar capacitor.

The method for controlling the conversion circuit in this embodiment is the same as that in Embodiment 1 and is not described in detail herein. In the conversion circuit of FIG. 4 provided in this embodiment, stress of a synchronous rectifier tube may be lowered when a voltage of the direct current source V2 is relatively high. In addition, when a current of the direct current source V2 is relatively large, because coils of the transformer at the direct current source side may be reduced by one, a wire diameter of the coils may be relatively large, to reduce loss. An optimal application of the conversion circuit provided in this embodiment is a case in which the amplitude of the direct current source V2 is higher than 45 V, and the output power is between 1 KW and 5 KW.

Embodiment 3

Figure 5:
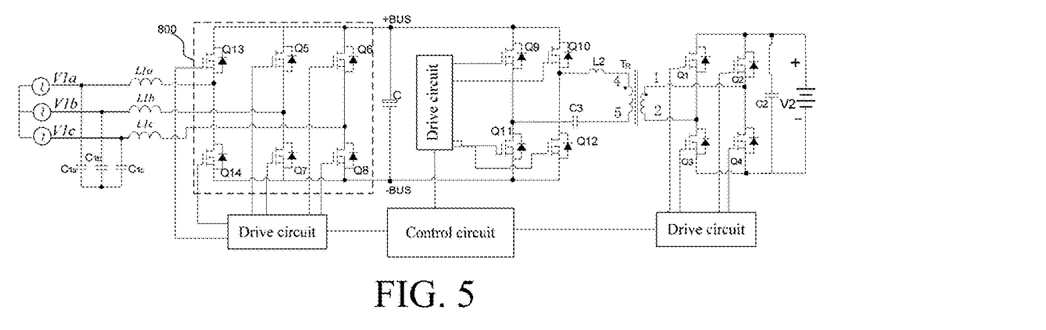
FIG. 5 is a schematic diagram of a high-frequency isolation alternating/direct current conversion circuit according to Embodiment 3 of the present application.

This embodiment provides a high-frequency isolation alternating/direct current conversion circuit shown in FIG. 5. In this embodiment, a single-phase alternating current source is replaced with a three-phase alternating current source V1a, V1b, and V1c, and phases are connected to LC filters (that are respectively an inductor L1a and a capacitor C1a, an inductor L1b and a capacitor C1b, and an inductor L1c and a capacitor C1c). The high-frequency full-bridge inverter circuit (including the switch tubes Q5 to Q8) in Embodiment 2 is replaced with a three-phase full-bridge inverter circuit 800 (the switch tubes Q5 to Q8, Q13, and Q14 in FIG. 5). A capacitor C3 in this embodiment is the same as the capacitor C3 in Embodiment 2 and preferably uses a high-frequency non-polar capacitor. Because the three-phase alternating current source is used in this embodiment, a situation in which the power is relatively large or a situation that has a very high requirement on power distribution balance at an alternating current side can be satisfies. A method for controlling a conversion circuit in this embodiment is the same as that in Embodiment 1 and is not described in detail herein. An optimal application of the conversion circuit provided in this embodiment is a case in which the amplitude of the direct current source V2 is higher than 80 V, and the output power is above 3 KW.

Although the present application is described above in further detail through specific embodiments, the present application is not limited to the specific embodiments. It should be understood by persons of ordinary skill in the art that any equivalent substitution or obvious transformation that has the same performances or use and that is made without departing from the spirit of the present application shall fall within the protection scope of the present application.

What is claimed is:

1. A high-frequency isolation alternating/direct current conversion circuit, comprising: a single-phase alternating current source, a direct current source, a first capacitor, a second capacitor, a high-voltage energy-storage filter, a high-frequency full-bridge inverter circuit, a first high-frequency half-bridge inverter circuit, a second high-frequency half-bridge inverter circuit, a drive circuit, a first inductor, a second inductor, a third inductor, a first high-frequency isolation transformer, a second high-frequency isolation transformer, a first direct current side synchronous switch, a second direct current side synchronous switch, and a control circuit connected to the drive circuit, wherein the first capacitor is connected in parallel to the single-phase alternating current source, the second capacitor is connected in parallel to the direct current source, and the high-frequency full-bridge inverter circuit, the first high-frequency half-bridge inverter circuit and the second high-frequency half-bridge inverter circuit are each composed of a switch tube;

in the high-frequency full-bridge inverter circuit, a first alternating current end and a second alternating current end are respectively connected to a second end of the first inductor and a second end of the first capacitor, a first direct current end and a second direct current end are respectively connected to a positive pole and a negative pole of the high-voltage energy-storage filter, and a first end of the first inductor is connected to a first end of the first capacitor;

in the first high-frequency half-bridge inverter circuit, a first direct current end and a second direct current end are respectively connected to the positive pole and the negative pole of the high-voltage energy-storage filter, a first alternating current end is connected to one end of the first high-frequency isolation transformer at a single-phase alternating current source side by means of the second inductor, and a second alternating current end is connected to the other end of the first high-frequency isolation transformer at the single-phase alternating current source side;

in the second high-frequency half-bridge inverter circuit, a first direct current end and a second direct current end are respectively connected to the positive pole and the negative pole of the high-voltage energy-storage filter, a first alternating current end is connected to one end of the second high-frequency isolation transformer at a single-phase alternating current source side by means of the third inductor, and a second alternating current end is connected to the other end of the second high-frequency isolation transformer at the single-phase alternating current source side;

the first direct current side synchronous switch comprises a first switch tube and a second switch tube, drains of the first switch tube and the second switch tube are respectively connected to a first end and a third end of the first high-frequency isolation transformer at the direct current source side, and sources of the first switch tube and the second switch tube are both connected to a negative pole of the direct current source;

the second direct current side synchronous switch comprises a third switch tube and a fourth switch tube, drains of the third switch tube and the fourth switch tube are respectively connected to a first end and a third end of the second high-frequency isolation transformer at the direct current source side, and sources of the third switch tube and the fourth switch tube are both connected to the negative pole of the direct current source; and second ends of the first high-frequency isolation transformer and the second high-frequency isolation transformer at the direct current source side are both connected to a positive pole of the direct current source;

wherein the control circuit is configured to control the high-frequency isolation alternating/direct current conversion circuit to switch between a rectification mode and an inversion mode for operating, such that:

when the conversion circuit operates in the rectification mode, controlling the high-frequency full-bridge inverter circuit to operate in a PFC rectification state and performing voltage boosting; controlling the first high-frequency half-bridge inverter circuit and the second high-frequency half-bridge inverter circuit to operate in an inversion state; under the condition of an absorption current of the direct current source is greater than or equal to 0.1 time of a rated current, driving, by using a PWM signal, the first switch tube to the fourth switch tube to be turned on, wherein turn-on timing sequences of the first switch tube and the second switch tube offset by using the center of a turn-on timing sequence of the first high-frequency half-bridge inverter circuit as a basis, and turn-on timing sequences of the third switch tube and the fourth switch tube offset by using the center of a turn-on timing sequence of the second high-frequency half-bridge inverter circuit as a basis; and adjusting a turn-on duty cycle according to a switching frequency; and when the conversion circuit operates in the inversion mode, according to a voltage of the direct current source, controlling the first high-frequency half-bridge inverter circuit to be turned on/turned off by using the center of a turn-on timing sequence of the first direct current side synchronous switch as a basis and the second high-frequency half-bridge inverter circuit to be turned on/turned off by using the center of a turn-on timing sequence of the second direct current side synchronous switch as a basis, and performing offset and adjusting the turn-on duty cycle according to the voltage of the direct current source.

2. The high-frequency isolation alternating/direct current conversion circuit according to claim 1, wherein the first high-frequency half-bridge inverter circuit comprises a third capacitor and a fourth capacitor, the second high-frequency half-bridge inverter circuit comprises a fifth capacitor and a sixth capacitor, and the third capacitor, the fourth capacitor, the fifth capacitor and the sixth capacitor are high-frequency non-polar capacitors.

3. The high-frequency isolation alternating/direct current conversion circuit according to claim 1, wherein the number of turns of coils of the first high-frequency isolation transformer and the second high-frequency isolation transformer at the direct current source side is less than 4, and the first high-frequency isolation transformer and the second high-frequency isolation transformer at the direct current source side have leakage inductance.

4. The high-frequency isolation alternating/direct current conversion circuit according to claim 1, wherein when the conversion circuit operates in the rectification mode and the inversion mode, a timing sequence phase of the first direct current side synchronous switch differs from that of the first high-frequency half-bridge inverter circuit by a ¼ working cycle, and a timing sequence phase of the second direct current side synchronous switch differs from that of the second high-frequency half-bridge inverter circuit by a ¼ working cycle.

5. The high-frequency isolation alternating/direct current conversion circuit according to claim 1, wherein when the conversion circuit operates in the rectification mode, if the absorption current of the direct current source is less than 0.1 time of the rated current, the first switch tube to the fourth switch tube are controlled to be turned off so that the first direct current side synchronous switch and the second direct current side synchronous switch operate in a diode rectification state.

6. A high-frequency isolation alternating/direct current conversion circuit, comprising: a single-phase alternating current source, a direct current source, a first capacitor, a second capacitor, a third capacitor, a high-voltage energy-storage filter, a first high-frequency full-bridge inverter circuit, a second high-frequency full-bridge inverter circuit, a third high-frequency full-bridge inverter circuit, a drive circuit, a first inductor, a second inductor, a high-frequency isolation transformer, and a control circuit connected to the drive circuit, wherein the first capacitor is connected in parallel to the single-phase alternating current source, the second capacitor is connected in parallel to the direct current source, and the first high-frequency full-bridge inverter circuit, the second high-frequency full-bridge inverter circuit and the third high-frequency full-bridge inverter circuit are each composed of a switch tube;

in the first high-frequency full-bridge inverter circuit, a first alternating current end and a second alternating current end are respectively connected to a second end of the first inductor and a second end of the first capacitor, a first direct current end and a second direct current end are respectively connected to a positive pole and a negative pole of the high-voltage energy-storage filter, and a first end of the first inductor is connected to a first end of the first capacitor;

in the second high-frequency full-bridge inverter circuit, a first alternating current end is connected to a first end of the high-frequency isolation transformer at a single-phase alternating current source side by means of the second inductor, a second alternating current end is connected to a second end of the high-frequency isolation transformer at the single-phase alternating current source side by means of the third capacitor, and a first direct current end and a second direct current end are respectively connected to the positive pole and the negative pole of the high-voltage energy-storage filter; and in the third high-frequency full-bridge inverter circuit, a first direct current end and a second direct current end are respectively connected to a positive pole and a negative pole of the direct current source, and a first alternating current end and a second alternating current end are respectively connected to a first end and a second end of the high-frequency isolation transformer at the direct current source side;

wherein the control circuit is configured to control the high-frequency isolation alternating/direct current conversion circuit to switch between a rectification mode and an inversion mode for operating, such that:

when the conversion circuit operates in the rectification mode, controlling the first high-frequency full-bridge inverter circuit to operate in a PFC rectification state and performing voltage boosting; controlling the second high-frequency full-bridge inverter circuit and the third high-frequency full-bridge inverter circuit to operate in an inversion state; under the condition of an absorption current of the direct current source is greater than or equal to 0.1 time of a rated current, driving, by using a PWM signal, a first switch tube to a fourth switch tube to be turned on, wherein turn-on timing sequences of the first switch tube and the fourth switch tube offset by using the center of a turn-on timing sequence of the second high-frequency full-bridge inverter circuit as a basis, and turn-on timing sequences of the third switch tube and the second switch tube offset by using the center of a turn-on timing sequence of the second high-frequency full-bridge inverter circuit as a basis; and adjusting a turn-on duty cycle according to a switching frequency; and when the conversion circuit operates in the inversion mode, according to a voltage of the direct current source, controlling the second high-frequency full-bridge inverter circuit to be turned on/turned off by using the center of a turn-on timing sequence of the third high-frequency full-bridge inverter circuit as a basis, and performing offset and adjusting the turn-on duty cycle according to the voltage of the direct current source.

7. The high-frequency isolation alternating/direct current conversion circuit according to claim 6, wherein the third capacitor is a high-frequency non-polar capacitor.

8. A high-frequency isolation alternating/direct current conversion circuit, comprising: a three-phase alternating current source, a direct current source, a high-voltage energy-storage filter, a first high-frequency full-bridge inverter circuit, a second high-frequency full-bridge inverter circuit, a third high-frequency full-bridge inverter circuit, a drive circuit, a resonant inductor, a resonant capacitor, a filter capacitor at a direct current side, a high-frequency isolation transformer, and a control circuit connected to the drive circuit, wherein the three-phase alternating current source is coupled to an alternating current end of the first high-frequency full-bridge inverter circuit, a first direct current end and a second direct current end of the first high-frequency full-bridge inverter circuit are respectively connected to a positive pole and a negative pole of the high-voltage energy-storage filter, and an LC filter is connected between the three-phase alternating current source and the alternating current end of the first high-frequency full-bridge inverter circuit;

in the second high-frequency full-bridge inverter circuit, a first alternating current end is connected to a first end of the high-frequency isolation transformer at a three-phase alternating current source side by means of the resonant inductor, a second alternating current end is connected to a second end of the high-frequency isolation transformer at the three-phase alternating current source side by means of the resonant capacitor, and a first direct current end and a second direct current end are respectively connected to the positive pole and the negative pole of the high-voltage energy-storage filter; and in the third high-frequency full-bridge inverter circuit, a first direct current end and a second direct current end are respectively connected to a positive pole and a negative pole of the direct current source, and a first alternating current end and a second alternating current end are respectively connected to a first end and a second end of the high-frequency isolation transformer at the direct current source side;

wherein the control circuit is configured to control the high-frequency isolation alternating/direct current conversion circuit to switch between a rectification mode and an inversion mode for operating, such that:

when the conversion circuit operates in the rectification mode, controlling the first high-frequency full-bridge inverter circuit to operate in a PFC rectification state and performing voltage boosting; controlling the second high-frequency full-bridge inverter circuit and the third high-frequency full-bridge inverter circuit to operate in an inversion state; under the condition of an absorption current of the direct current source is greater than or equal to 0.1 time of a rated current, driving, by using a PWM signal, a first switch tube to a fourth switch tube to be turned on, wherein turn-on timing sequences of the first switch tube and the fourth switch tube offset by using the center of a turn-on timing sequence of the second high-frequency full-bridge inverter circuit as a basis, and turn-on timing sequences of the third switch tube and the second switch tube offset by using the center of a turn-on timing sequence of the second high-frequency full-bridge inverter circuit as a basis; and adjusting a turn-on duty cycle according to a switching frequency; and when the conversion circuit operates in the inversion mode, according to a voltage of the direct current source, controlling the second high-frequency full-bridge inverter circuit to be turned on/turned off by using the center of a turn-on timing sequence of the third high-frequency full-bridge inverter circuit as a basis, and performing offset and adjusting the turn-on duty cycle according to the voltage of the direct current source.

9. The high-frequency isolation alternating/direct current conversion circuit according to claim 8, wherein the resonant capacitor is a high-frequency non-polar capacitor.

* * * * *